United States Patent
Weenink et al.

(10) Patent No.: US 11,682,953 B2
(45) Date of Patent: Jun. 20, 2023

(54) SYSTEM FOR ASSEMBLING A GENERATOR, GENERATOR VERTICAL ASSEMBLY DEVICE AND CORRESPONDING ASSEMBLING METHOD

(71) Applicant: Wobben Properties GmbH, Aurich (DE)

(72) Inventors: Gerbert Weenink, Le Apeldoorn (NL); Robert van Hofwegen, Nijkerk (NL); Bernd Cyrus, Ihlow (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/219,063

(22) Filed: Mar. 31, 2021

(65) Prior Publication Data

US 2021/0313866 A1    Oct. 7, 2021

(30) Foreign Application Priority Data

Apr. 3, 2020 (EP) ..................................... 20168049

(51) Int. Cl.
*H02K 15/16* (2006.01)
*F03D 13/10* (2016.01)
*H02K 15/14* (2006.01)

(52) U.S. Cl.
CPC ............. *H02K 15/16* (2013.01); *F03D 13/10* (2016.05); *H02K 15/14* (2013.01); *F05B 2230/61* (2013.01)

(58) Field of Classification Search
CPC ........ B22C 5/12; F03D 13/10; F05B 2230/61; H02K 15/0006; H02K 15/03; H02K 15/14; H02K 15/16
See application file for complete search history.

(56) References Cited

U.S. PATENT DOCUMENTS

| | | | |
|---|---|---|---|
| 8,256,100 B2 * | 9/2012 | Mishina | H02K 15/068 29/736 |
| 9,627,949 B2 * | 4/2017 | Booth | H02K 15/02 |
| 2012/0038166 A1 * | 2/2012 | Tsumagari | H02K 7/003 290/55 |
| 2021/0313866 A1 * | 10/2021 | Weenink | H02K 15/03 |

FOREIGN PATENT DOCUMENTS

| | | |
|---|---|---|
| CN | 109698587 A | 4/2019 |
| EP | 2372884 A1 | 10/2011 |
| EP | 2299560 B1 | 11/2018 |
| EP | 2667493 B1 | 11/2019 |
| JP | 2001078396 A | 3/2001 |

* cited by examiner

*Primary Examiner* — Minh N Trinh
(74) *Attorney, Agent, or Firm* — Seed Intellectual Property Law Group LLP (57) ABSTRACT

A system for assembling a generator, preferably a permanently excited generator of a wind turbine, comprising a rotor and a stator. A vertical assembly device connectable to the rotor and the stator is proposed, for guiding the rotor in parallel and coaxially aligned to the stator during assembly, the vertical assembly device comprising a first assembly element being connectable to the rotor, a second assembly element being connectable to the stator, and guiding means for guiding the first assembly element coaxially aligned to the second assembly element.

15 Claims, 5 Drawing Sheets

SYSTEM FOR ASSEMBLING A GENERATOR, GENERATOR VERTICAL ASSEMBLY DEVICE AND CORRESPONDING ASSEMBLING METHOD

BACKGROUND

Technical Field

The invention relates to a system for assembling a generator, preferably a permanently excited generator of a wind turbine, comprising a rotor and a stator.

Description of the Related Art

Systems for assembling a generator of a wind turbine, preferably a permanently excited generator of a wind turbine, are generally known in the prior art. In this regard, the term permanently excited generator relates to a generator at which the magnetic field is at least partially generated by permanent magnets. Permanently excited generators typically require a precise assembling routine. It is crucial to exactly align the main components, rotor and stator, with respect to each other and guide the rotor into the stator or the stator upon the rotor under exact guidance to avoid excessive magnetic forces that might occur in case rotor and stator approach each other to closely during assembling. In order to achieve this, assembly arrangements that are configured to assist in the aligning procedure are known from the prior art.

EP 2 667 493 B1 relates to an assembly arrangement for use in the vertical assembly of a generator of a wind turbine. The assembly arrangement comprises an assembly support onto which a rotor is placed. The stator is guided into the rotor and aligned relative to the rotor by means of spacer blocks. After arranging the stator in the rotor, permanent magnets are mounted to the rotor.

The proposed solution requires the installation of magnets after the assembly of the rotor and the stator. This, however, requires an exact alignment of the magnets which can only be achieved properly in controlled environments, such as assembly or manufacturing facilities.

Further, in the priority application case EP 20168049 the following prior art documents were cited in the European Search Report: CN 109698587 A, EP 2299560 B1, EP 2372884 A1 and JP 2001078396 A EP 2 299 560 B1 proposes the use of temporarily installed guiding rings for a synchronous machine, wherein the guiding rings are arranged at a stator and a rotor prior to guiding the rotor into the stator. However, the guiding rings need to be removed after assembly, which is difficult to achieve due to their rather poor accessibility.

Consequently, in the state of the art, generators are mounted at assembly or manufacturing facilities in controlled environments and are transported to the installation site of the wind turbine afterwards. However, one of the drawbacks of this is that due to the excessive weight of such generators, transporting the assembled generator to the installation site is often challenging and costly.

BRIEF SUMMARY

Provided is a system for assembling a generator and overcomes at least some of the above-mentioned issues. In particular, provided is a system for assembling a generator that allows for a flexible assembling of the generator components, even directly at the installation site of a wind turbine.

Provided is a vertical assembly device being connectable to the rotor and the stator, for guiding the rotor in parallel and coaxially aligned to the stator during assembly, the vertical assembly device comprising: a first assembly element being connectable to the rotor, a second assembly element being connectable to the stator, and guiding means for guiding the first assembly element coaxially aligned to the second assembly element.

Compared to known solutions, such a vertical assembly device allows for a location-independent assembly of the generator components. The system may be used in an assembly or manufacturing facility but also directly at an installation site of a wind turbine. The first assembly element, the second assembly element and the guiding means are separate parts. The guiding means ensure an exact guidance of the two components rotor and stator relative to one another in parallel and coaxially aligned. An air gap between rotor and stator is kept at a constant level at all times avoiding excessive magnetic forces to arise during assembly. The vertical assembly device can be connected to the components of a generator on site and can easily be removed after the assembly process. One assembling system can therefore be used for a plurality of generator assembly processes. Hence, for example, only one assembling system is required for the installation of several identical generators of a whole wind farm and may easily be transported to different locations.

Preferably, the system further comprises a driving means that is configured to vertically move the first assembly element and the second assembly element relative to one another. According to a preferred embodiment, the driving means comprises one or more hydraulic cylinders. In case more than one hydraulic drive is used, a closed loop position control may be utilized to differentially operate the hydraulic drives to provide advanced aligning capabilities. With the help of this, the alignment between rotor and stator may be improved further.

In a preferred embodiment, the hydraulic cylinders are double-acting hydraulic cylinders. It is furthermore preferred that the rotor comprises a bearing with the help of which the stator is screwed or bolted together after assembling.

In yet another preferred embodiment, the first assembly element is permanently connected to the second assembly element.

Preferably, the second assembly element comprises an outer tube and the first assembly element comprises an inner tube that is coaxially arranged and longitudinally movable within the outer tube. In this regard, the expression "longitudinally" refers to the direction along the longitudinal axis of the outer tube. This setup helps to provide an exact alignment between the components of the vertical assembly device and the generator components itself. Through this, a tilting of the components is inhibited.

According to yet another embodiment, the guiding means comprises a linear guide that is configured to inhibit a rotation of the first assembly element and the second assembly element relative to one another. Especially for assembling permanently excited generators, it is not only required to provide a tilt-free guidance of the rotor and the stator, but also to establish and maintain a certain relative angular position between the components. It has been found to be beneficial to establish this utilizing a linear guide.

According to an alternative embodiment, the linear guide comprises a radially adjustable linear guide that is configured to fine-tune the positioning of the rotor and the stator relative to one another in the radial direction. Such an adjustable linear guide increases the capabilities for fine tuning the relative positioning and guiding of the stator relative to the rotor even more.

In a preferred embodiment, the linear guide comprises angular guiding elements arranged on one of the first assembly element or the second assembly element and an angular guide arranged on the other of the first assembly element or the second assembly element, and configured to receive the angular guiding elements. This has been found as an easy to manufacture and handle way of establishing the linear guiding. It also enables a release of the first and second assembly element and a connecting of the components during the assembling process, e.g., in case the stator is provided by a lifting crane. In yet another embodiment, sliding pads are arranged between the first assembly element and the second assembly element.

According to an alternative embodiment, the system comprises a support means that are configured to hold at least one of the rotor or the stator.

It is furthermore preferred that the support means comprises a rotor support and a stator support configured to coaxially hold the stator above the rotor. This allows a pre-aligning of the two components simplifying the setup of the vertical assembly device.

Preferably, the rotor support and the stator support are arranged on a common platform. This is especially important when assembling the generator onsite and on uneven ground.

According to a preferred embodiment, the system comprises spacing means that are configured to be temporarily arranged in an air gap between the rotor and the stator for guiding the rotor relative to the stator during lifting and assembling. With the help of this the alignment of rotor and stator is improved further.

Preferably, the spacing means are selected from the following list: Sliding plates arranged at the rotor, sliding plates arranged at the stator, guiding rollers, preferably adjustable guiding rollers, arranged at the stator. These devices have been found to be most suitable for the intended use.

In a preferred embodiment, the spacing means furthermore comprise a coating and/or intermediate layer for reducing friction, the coating and/or layer being arranged at the rotor, the stator and/or the sliding plates. This allows a smoother transitioning of the components and an increased service life of the components.

In another preferred embodiment, the system comprises three or more positioning means arranged equidistantly around a contact diameter of the rotor with the stator and configured to radially position the rotor in the stator, the positioning means comprising at least one of protective wedges or shim plates. These means have been found to improve the fine-tuning and alignment options when assembling the generator.

Preferably, the stator support comprises a radially resilient support which avoids damages to the stator.

In a further aspect, provided is a method of assembling a generator, preferably a permanently excited generator of a wind turbine, wherein the generator comprises a rotor and a stator, by means of an assembling system according to any of the preceding claims. The method comprises the steps of connecting the first assembly element of the vertical assembly device to the rotor, connecting the second assembly element of the vertical assembly device to the stator, connecting the first assembly element to the second assembly element, and moving at least one of the stator or the rotor towards the other, wherein the vertical assembly device ensures that the rotor and stator are in parallel and coaxially aligned to one another during the movement.

The method takes advantage of the same benefits and preferred embodiments as the assembling system described hereinabove. In this regard, to avoid unnecessary repetition, reference is made to the above explanations.

In summary, the method enables a precise and location-independent assembly of a generator, which may even be performed directly at an installation site of a wind turbine. The method ensures an exact guidance of the two components rotor and stator relative to one another in parallel and coaxially aligned.

Preferably, the method further comprises the steps: removing the vertical assembly device, assembling the generator on a wind turbine. The vertical assembly device may afterwards be reused.

It is moreover preferred that the method comprises: spacing the stator to the rotor by disposing spacing means in an air gap between the rotor and stator for guiding the rotor relative to the stator, removing the spacing means after positioning the rotor within the stator. With the help of this the alignment of rotor and stator is improved further.

According to yet another embodiment, the method further comprises radially positioning the rotor in the stator by using positioning means, preferably protective wedges or shim plates, arranged equidistantly around a contact diameter of the rotor with the stator. This provides another means for aligning and fine-tuning the relative positioning of the two components rotor and stator.

Preferably, the method further comprises arranging the rotor on a rotor support, arranging the stator on a stator support above and coaxially aligned to the rotor, lifting the rotor into the stator by using the driving means of the vertical assembly device. In this embodiment, the rotor is lifted into the stator by using the driving means of the vertical assembly device which has found to be a precise and reliable way of assembling the components.

According to an alternative preferred embodiment, the method comprises lifting the stator above the rotor, preferably by means of a lifting crane, lowering the stator after connecting the first assembly element of the vertical assembly device to the second assembly element, for ensuring a parallel and aligned guidance of the stator to the rotor.

According to yet another preferred embodiment, the method comprises permanently connecting the first assembly element to the second assembly element, lifting the stator above the rotor, preferably by means of a lifting crane, after connecting the second assembly element to the stator, lowering the stator, connecting the first assembly element to the rotor and further lowering the stator, for ensuring a parallel and aligned guidance of the stator to the rotor. The aspects of the disclosure may be best understood from the following detailed description taken in conjunction with the accompanying figures. The Figures are schematic and simplified for clarity, and they just show details to improve the understanding of the claims while other details are left out. Throughout, the same reference numerals are used for identical or corresponding parts. The individual features of each aspect may each be combined with any or all features of other aspects.

BRIEF DESCRIPTION OF THE SEVERAL VIEWS OF THE DRAWINGS

These and other aspects, features and/or technical effects will be apparent from and elucidated with reference to the illustrations described hereafter, in which.

DETAILED DESCRIPTION

Figure 1:
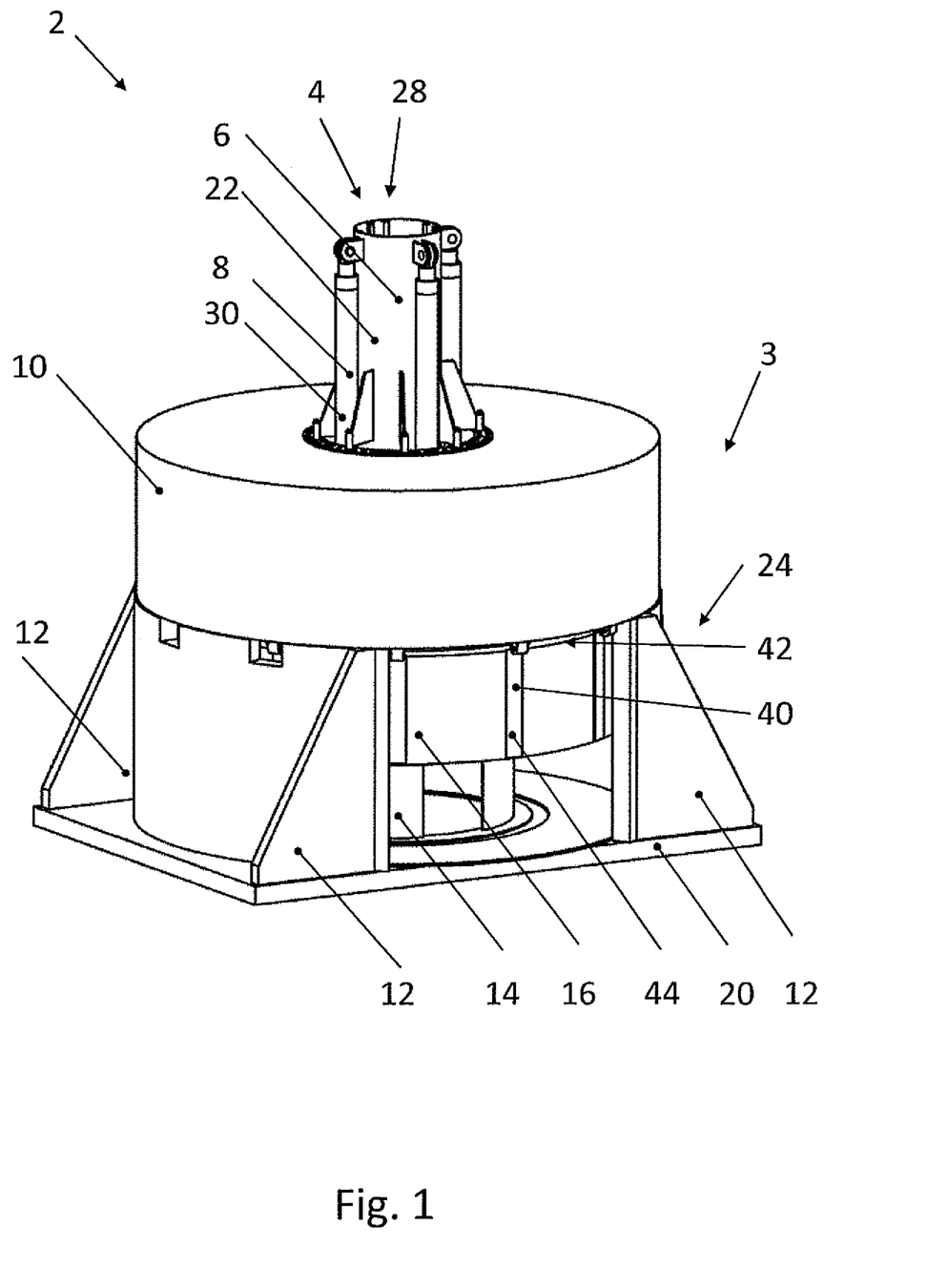
FIG. 1 shows a preferred embodiment of a system for assembling a generator in a perspective view.

FIG. 1 shows a system 2 for assembling a generator 3. The generator 3 comprising a rotor 16 and a stator 10. The generator 3 is preferably a permanently excited generator 3 of a wind turbine (not shown).

The system 2 comprises a support 24 having a rotor support 14 and a stator support 12 for coaxially holding the stator 10 above the rotor 16 and a vertical assembly device 4. The stator support 12 and the rotor support 14 are arranged on a common plate 20. The vertical assembly device 4 is connectable to the rotor 16 and the stator 10.

The vertical assembly device 4 comprises a first assembly element 26 (see FIG. 2) being connectable to the rotor 16 and a second assembly element 6, having the form of an outer tube 22, being connectable to the stator 10. The first assembly element 26 is guided relative to the second assembly element 6 by guiding means 28 (or a guide). The vertical assembly device 4 moreover comprises a driving means 30 (or an actuator) for moving the first assembly element 26 relative to the second assembly element 6. In the embodiment of FIGS. 1-4, the driving means 30 comprises four hydraulic cylinders 8.

Spacing means 40 are arranged temporarily in an air gap 42 between the rotor 16 and the stator 10 for guiding the rotor 16 relative to the stator 10 during lifting and assembling. As spacing means 40, sliding plates 44 arranged at the rotor 16 are visible in FIG. 1.

Figure 2:
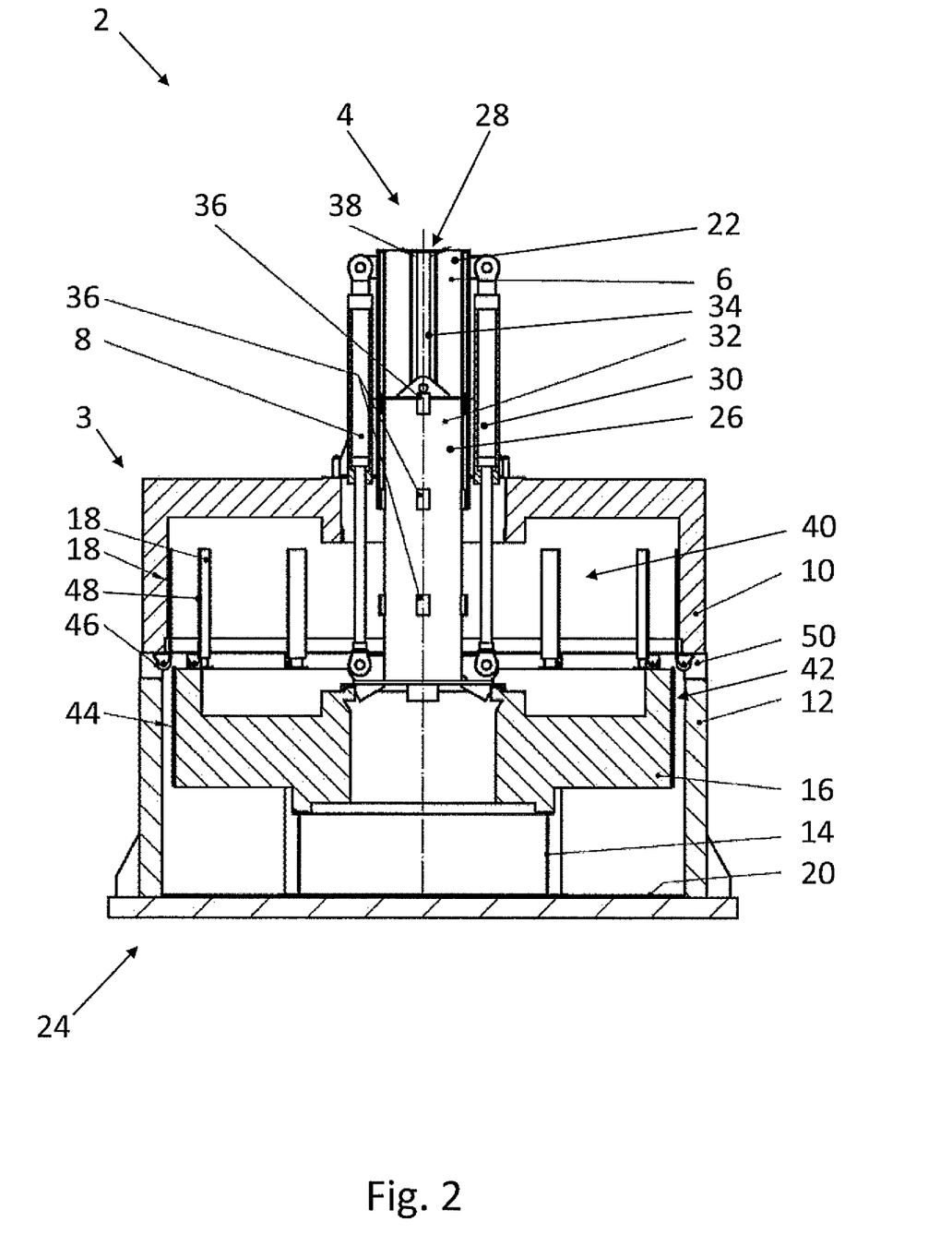
FIG. 2 shows the system for assembling a generator according to FIG. 1 in a sectional view.

FIG. 2 shows a sectional view of the system 2 in an initial state at which the rotor 16 rests upon the rotor support 14 and the stator 10 rests on the stator support 12. The stator support 12 comprises a radially resilient support 50. The first assembly element 26 is connected to the rotor 16, the second assembly element 6 to the stator 10.

From this figure, the detailed structure of the vertical assembly device 4 can be obtained. The second assembly element 6 is configured as an outer tube 22 and the first assembly element 26 is configured as an inner tube 32 being coaxially arranged to and longitudinally movable within the outer tube 22. The linear guide 34 may optionally be configured as an adjustable linear guide 34 for fine-tuning the positioning of the rotor 16 relative to the stator 10. The linear guide 34 comprises angular guiding elements 36 arranged on the first assembly element 26 and an angular guide 38 arranged on the second assembly element 6 for receiving the angular guiding elements 36 and for inhibiting a rotation of the first assembly element 26 relative to the second assembly element 6.

The system 2 moreover comprises the spacing means 40 arrangeable temporarily in the air gap 42 between the rotor 16 and the stator 10. The spacing means 40 comprise sliding plates 44 arranged at the rotor 16, sliding plates 18 arranged at the stator 10 and guiding rollers 46, preferably adjustable guiding rollers 46, arranged at the stator 10. The spacing means 40 furthermore comprise a coating and/or intermediate layer 48 for reducing friction, the coating and/or layer 48 being arranged at the rotor 16, the stator 10 and/or the sliding plates 44, 46.

Figure 3:
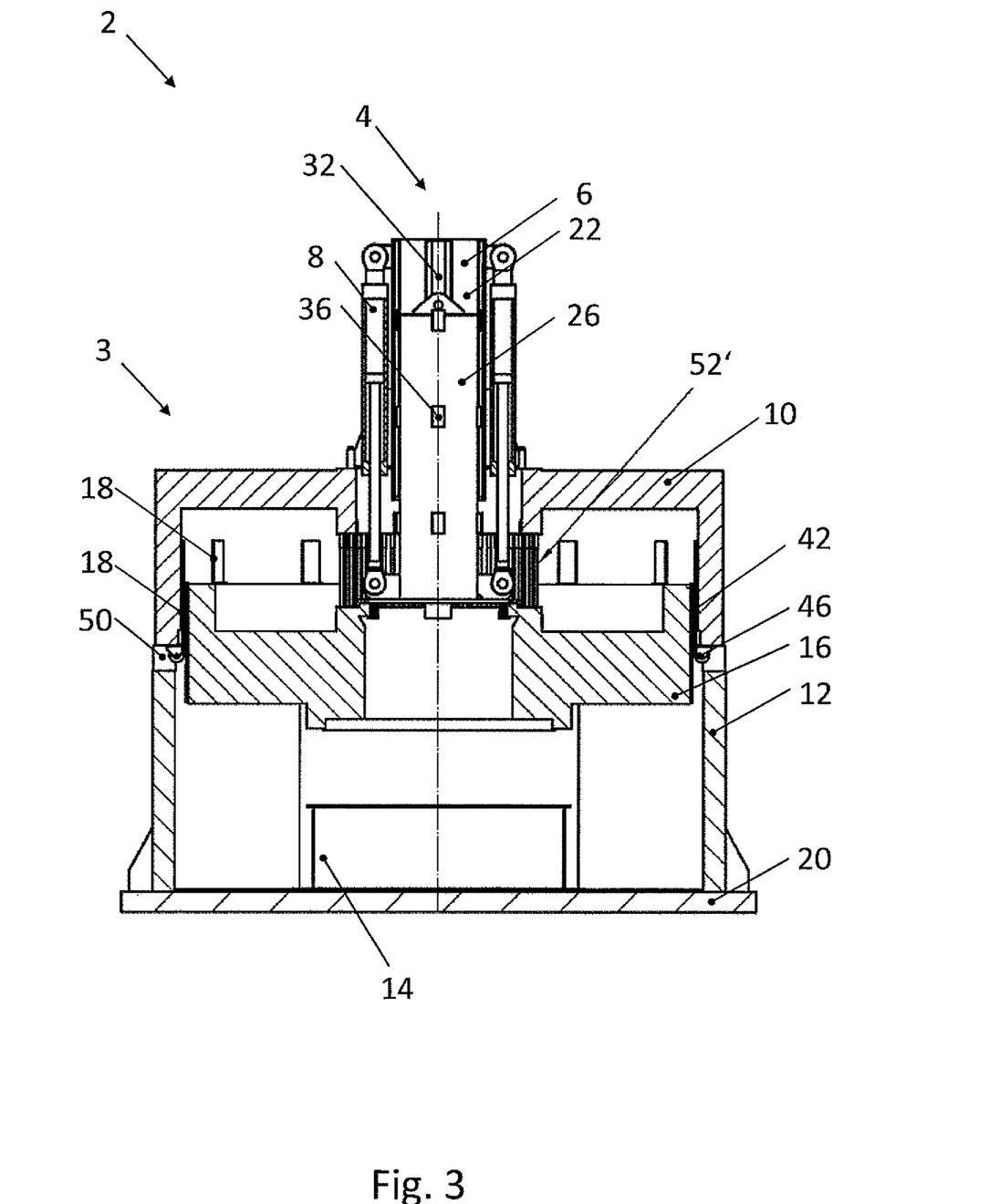
FIGS. 3, 4a, and 4b show the system for assembling a generator according to FIG. 1 in a sectional view in different operating states and levels of detail.

FIG. 3 shows the embodiment of FIGS. 1 and 2 in an assembling state at which the rotor 16 has been lifted about halfway into the stator 10 by the vertical assembly device 4. The rotor 16 no longer rests on the rotor support 14. The rotor sliding plates 44 and the stator sliding plates 18 are utilized—together with the linear guide 34—to align and center the rotor 16 during the lifting process. Furthermore, optional rotor studs 52', arranged at the rotor 16 are shown in FIG. 4. These were not part of FIGS. 1 and 2.

Figure 4A:
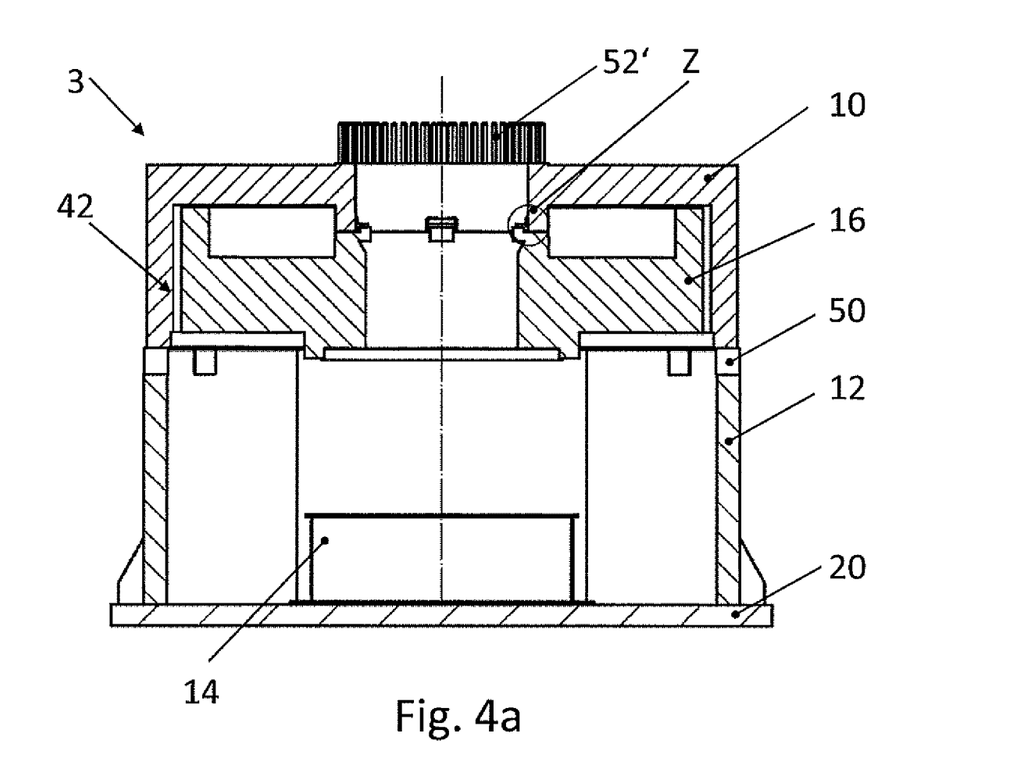

In the assembling state shown in FIG. 4a, the lifting process has been completed. The rotor 16 is mounted in the stator 10 and the spacing means 40, such as the rotor sliding plates 44 and the stator sliding plates 18, have been removed. The generator rests on the radially resilient support 50 of the stator support 12.

Figure 4B:
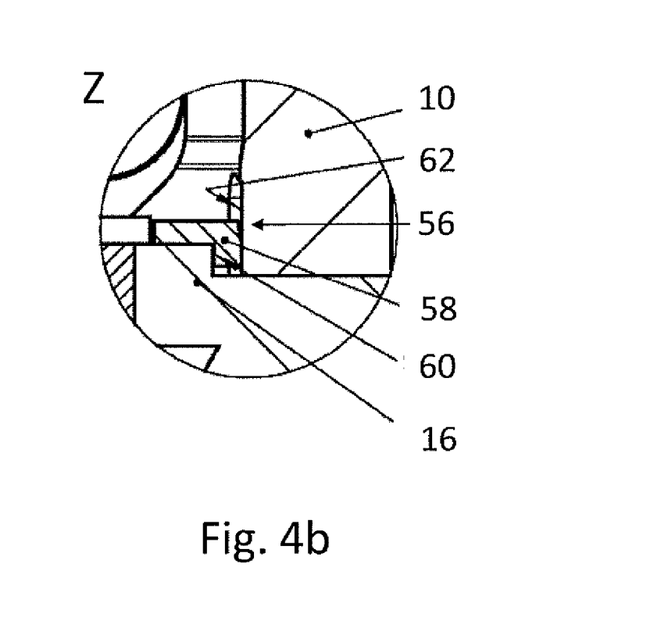

FIG. 4b shows a detailed view of the extract labelled with Z in FIG. 4a. FIG. 4b shows an additional means for fine-tuning the relative positioning of the rotor 16 with respect to the stator 10. In this regard, the stator 10 comprises machined surfaces 62 against which a protective wedge 58 and a shim plate 60 rests. Preferably, four protective wedges 58 and shim plates 60 are arranged equidistantly around a contact diameter of the stator 10 and the rotor 16. By utilizing protective wedges 58 and shim plates 60 of different sizes, rotor 16 and stator 10 may be positioned radially with regard to one another.

Figure 5:
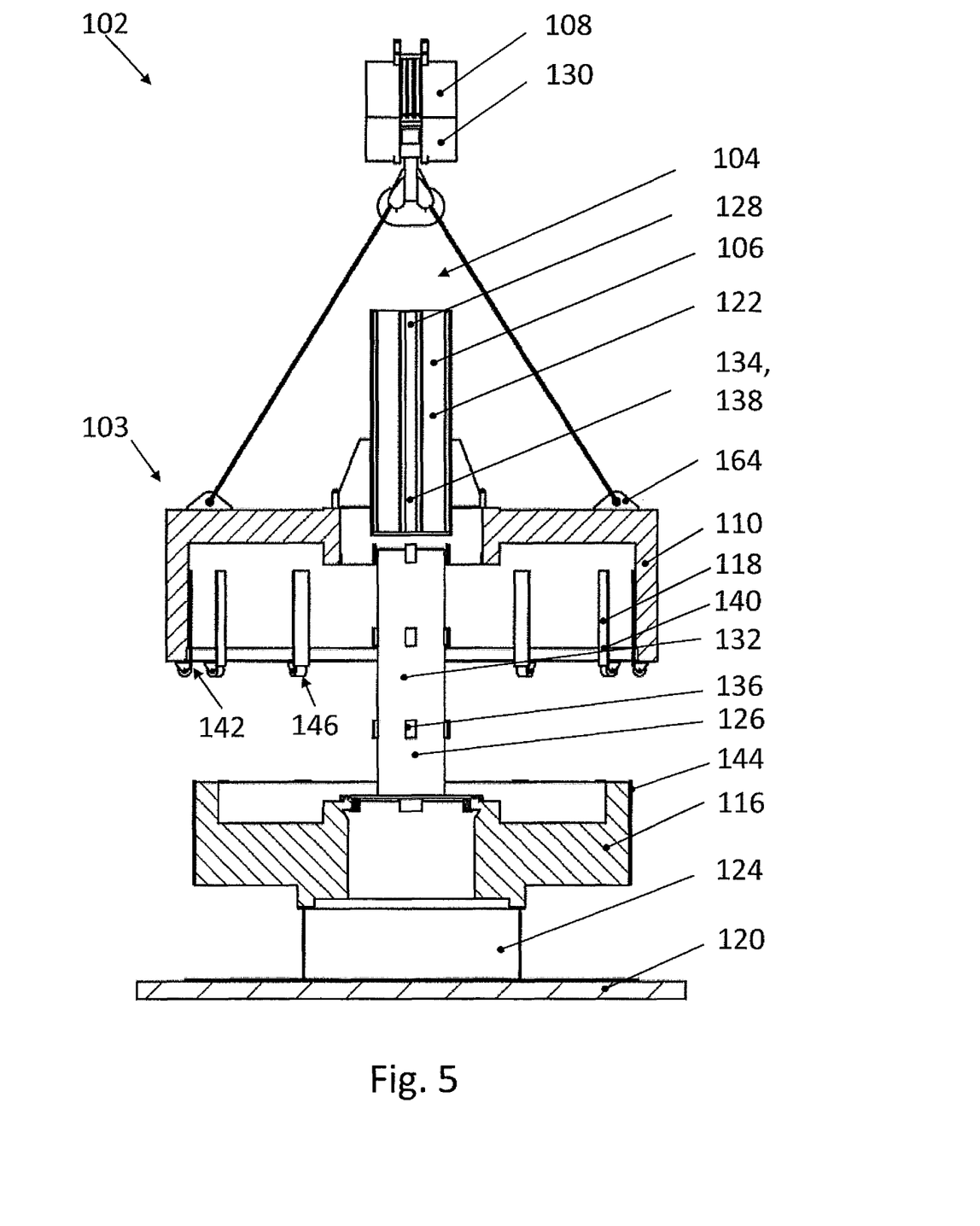
FIG. 5 shows an alternative embodiment of a system for assembling a generator in a perspective view.

FIG. 5 shows an alternative embodiment of an assembling system 102 utilizing a vertical assembly device 104 for assembling a generator 103. The generator 103 and its components rotor 116 and stator 110 are identical to the one shown in FIGS. 1-4b.

The rotor 116 rests on a support 124 which is connected to a floor plate 120. A first assembly element 126 is connected to the rotor 116. The first assembly element 126 is configured as an inner tube 132 and comprises angular guiding elements 136.

The stator 110 is lifted by a lifting crane 108 with the help of lifting eyes 164 arranged at the stator 110. A second assembly element 106 is connected to the stator 110. The second assembly element 106 is configured as an outer tube 122. The vertical assembly device 104 moreover comprises a guiding means 128 (or guide) for guiding the first assembly element 126 relative to the second assembly element 106, comprising a linear guide 134 having an angular guide 138 arranged at the second assembly element 106.

When lowering the stator 110 from the position shown in FIG. 5, the first assembly element 126 connects to the second assembly element 106 and aligns and guides the stator 110 with respect to the rotor 116. Rotor 116 and stator 110 comprise spacing means 140.

In this regard, the stator 110 comprises stator sliding plates 118 and the rotor 116 comprises rotor sliding plates 144 in the proximity to an air gap 142. The stator 110 furthermore comprises guiding rollers 146. When the stator 110 approaches the rotor 116 during lowering of the lifting crane 108, the spacing means 140 assist in aligning and positioning the stator 110 with respect to the rotor 116.

LIST OF REFERENCES

2 Assembling System
3 Generator
4 Vertical assembly device
6 Second assembly element 8 Hydraulic cylinder
10 Stator
12 Stator support
14 Rotor support
16 Rotor
18 Stator sliding plate
20 Floor plate
22 Outer tube
24 Support means
26 First assembly element
28 Guiding means
30 Driving means
32 Inner tube
34 Linear guide
36 Angular guiding elements
38 Angular guide
40 Spacing means
42 Air gap
44 Rotor sliding plate
46 Guiding rollers
48 Coating/intermediate layer
50 Radial resilient support
52' Rotor studs
54 Positioning means
56 Contact diameter
58 Protective wedge
60 Shim plates
62 Machined surfaces
102 Assembling System
103 Generator
104 Vertical assembly device
106 Second assembly element
108 Lifting crane
110 Stator
116 Rotor
118 Stator sliding plate
120 Floor plate
122 Outer tube
124 Support means
126 First assembly element
128 Guiding means
130 Driving means
132 Inner tube
134 Linear guide
136 Angular guiding elements
138 Angular guide
140 Spacing means
142 Air gap
144 Rotor sliding plate
146 Guiding rollers
164 Lifting eye The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system comprising:
a vertical assembly device configured to be connected to a rotor and a stator, the vertical assembly device being configured to guide the rotor in parallel and coaxially aligned with the stator for assembly of a generator of wind turbine, the vertical assembly device comprising:
a first assembly element configured to be coupled to the rotor;
a second assembly element configured to be coupled to the stator;
a guide configured to guide the first assembly element with the second assembly element such that the rotor is parallel and coaxially aligned with the stator, and
driving means comprising an actuator hydraulic cylinder, wherein the driving means is configured to vertically move at least one element of the first assembly element and the second assembly element relative to one another.

2. The system according to claim 1, wherein the second assembly element comprises an outer tube, and wherein the first assembly element comprises an inner tube that is coaxially arranged and longitudinally movable within the outer tube.

3. The system according to claim 1, wherein the guide is a linear guide configured to inhibit a rotation of the first assembly element and the second assembly element relative to one another.

4. The system according to claim 3, wherein the linear guide comprises a radially adjustable linear guide configured to fine-tune a position of the rotor relative to the stator in a radial direction.

5. The system according to claim 3, wherein the linear guide comprises angular guiding elements arranged on one of the first assembly element or the second assembly element, and wherein an angular guide arranged on the other assembly of the first assembly element or the second assembly element, wherein the angular guide is configured to receive the angular guiding elements.

6. The system according to claim 1, further comprising a support configured to hold at least one of the rotor or the stator.

7. The system according to claim 6, wherein the support comprises a rotor support and a stator support, wherein the stator support is configured to hold the stator coaxially above the rotor.

8. The system according to claim 1, comprising spacing means temporarily arranged in an air gap between the rotor and the stator, wherein the spacing means are configured for guiding the rotor relative to the stator during lifting and assembling, wherein the spacing means is selected from the following list:
sliding plates arranged at the rotor;
sliding plates arranged at the stator; or
guiding rollers arranged at the stator.

9. A method comprising:
assembling a generator of a wind turbine using a system comprising:
a vertical assembly device configured to be connected to a rotor and a stator, the vertical assembly device being configured to guide the rotor in parallel and coaxially aligned with the stator for assembly of a generator of wind turbine, the vertical assembly device comprising:
a first assembly element configured to be coupled to the rotor;
a second assembly element configured to be coupled to the stator;
a guide configured to guide the first assembly element with the second assembly element such that the rotor is parallel and coaxially aligned with the stator, and driving means comprising an actuator hydraulic cylinder configured to vertically move at least one element of the first assembly element and the second assembly element relative to one another, wherein the assembling comprises:

connecting the first assembly element of the vertical assembly device to the rotor;

connecting the second assembly element of the vertical assembly device to the stator;

connecting the first assembly element to the second assembly element; and moving at least one of the stator or the rotor towards the other, wherein the vertical assembly device aligns the rotor and stator relative to one another during the movement.

10. The method according to claim 9, further comprising:
spacing the stator relative to the rotor by disposing spacing means in an air gap between the rotor and stator for guiding the rotor relative to the stator; and
removing the spacing means after positioning the rotor within the stator.

11. The method according to claim 9, further comprising radially positioning the rotor in the stator by using positioning means arranged around a contact diameter of the rotor with the stator.

12. The method according to claim 9, further comprising:
arranging the rotor on a rotor support; and
arranging the stator on a stator support above and coaxially aligned with the rotor;
wherein the moving at least one of the stator or the rotor towards the other comprises lifting the rotor into the stator.

13. The method according to claim 9, further comprising:
lifting the stator above the rotor; and
wherein moving at least one of the stator or the rotor towards the other comprises lowering the stator after connecting the first assembly element of the vertical assembly device to the second assembly element.

14. The method according to claim 13, where lifting the stator above the rotor comprises using a lifting crane to lift the stator above the rotor.

15. The method according to claim 9, wherein the generator is a permanently excited generator.

* * * * *